United States Patent Office 3,586,719
Patented June 22, 1971

3,586,719
PROCESS FOR PREPARING 4-FLUORO-3-NITROANILINE
Milos S. Bil, Forest Hills, N.Y., assignor to Clairol Incorporated, New York, N.Y.
No Drawing. Continuation-in-part of application Ser. No. 683,758, Nov. 2, 1967. This application May 1, 1968, Ser. No. 725,936
Int. Cl. C07c 85/00
U.S. Cl. 260—578
11 Claims

ABSTRACT OF THE DISCLOSURE

Prepares 4-fluoro-3-nitroaniline by nitrating p-fluoroaniline under anhydrous conditions. Also employs diluted hydrochloric acid to separate product from reaction mixture.

This application is a continuation-in-part of application Ser. No. 683,758, filed Nov. 2, 1967.

This invention relates to a process for preparing 4-fluoro-3-nitroaniline and more particularly to a process for preparing this compound through the nitration of p-fluoroaniline.

Numerous attempts have been made in the literature to prepare 4-fluoro-3-nitroaniline by the nitration of p-fluoroaniline. However, these have remained laboratory curiosities mainly because of the low yield of products that were obtained. As a consequence, no real commercial process for preparing this product has been available in the prior art.

It has now been found that p-fluoroaniline can be more efficiently nitrated to 4-fluoro-3-nitroaniline if the nitration is carried out under *anhydrous* conditions. This makes the process a commercially feasible process by which high purity product can be obtained in high yields without resorting to any elaborate recovery procedures. It has been further found that the yield of 4-fluoro-3-nitroaniline may be further increased by using cold dilute hydrochloric acid to separate it from the other components of the crude reaction product.

It is accordingly an object of the present invention to provide a commercially feasible process for preparing 4-fluoro-3-nitroaniline through the nitration of p-fluoroaniline.

It is also an object of the present invention to provide a process of the above character in which the desired product is obtained in high yields and in a high state of purity with a minimum of effort expended in recovering or purifying the product.

Other and more detailed objects of this invention will be apparent from the following description and claims.

Holleman et al. (Rec. Trav. Chem., 1904, 23 237) describes a process for the nitration of p-fluoroaniline which involves dissolving the p-fluoroaniline in a large excess of "conc. $H_2SO_4$," i.e., ten times the weight of p-fluoroaniline. To this is added a nitrating mixture of nitric acid (density 1.5) which is also dissolved in a large excess of "conc. $H_2SO_4$." The "conc. $H_2SO_4$" employed by Holleman et al. is commercial concentrated sulfuric acid which contains about 6% of water. The authors recover a product having a melting point of 98° C. However, the yield that they obtain is not given. It will be apparent, nevertheless, from what is discussed below that the yield obtained by the Holleman et al. process was low.

Swarts (Rec. Trav. Chem., 1916, 35, 131) describes a process involving the nitration of p-fluoroaniline in a medium of $H_2SO_4$ which also contains water. To recover the product in a reasonable yield and purity, Swarts had to resort to an elaborate recovery system. This involved first carefully and completely extracting the alkaline reaction mixture with ether. The crude obtained from the ether solution was then dissolved in boiling water and the "resin" was separated. The "resin" was then extracted 3 times with boiling water. Only after this elaborate recovery procedure was Swarts able to report a yield of about 60%. By working up the mother liquor Swarts was able to raise the yield about another 2%.

Van Hove, in Bl. Acad. Belgique, [5], 1927, 12, 811, also discloses a process for nitrating p-fluoroaniline in the presence of a large excess of $H_2SO_4$. Similarly, this process does not utilize an anhydrous nitrating system which is reflected in the low yield obtained, namely, 32%, and he complains of the formation of large amounts of "resin."

Neunhoeffer et al., Ann., 1957, 610, 143, reports a process involving the nitration of p-fluoroaniline using the process of Holleman et al. discussed above. In accordance with the authors, they obtained a yield of only 10.7%. The process of this reference also is *not* one involving an anhydrous nitrating system.

The difficulty in nitrating p-fluoroaniline without some special protective device is also currently recognized. Thus, in their brochure "New Product—Organic Chemicals Olin, No. SC–3–1063, o-Fluoroaniline and p-Fluoroaniline," Olin Matheson notes:

"Nitration of p-fluoroaniline without protecting the amine group results in excessive oxidative reactions with low yields of nitro derivatives."

The low yields obtained in the prior art processes were due to the large amount of "resin" that was produced as a by-product in the reaction. This is noted in the Swarts reference above wherein the crude 4-fluoro-3-nitroaniline was redissolved in boiling water to separate it from the very substantial amount of "resin" which was formed. The problem is even more acutely noted in the Van Hove reference (also discussed above) wherein the author notes that the yield of the nitration of p-fluoroaniline is rather bad and that large amounts of "resin" are always formed.

Applicant has found that the formation of this "resin" is promoted by the presence of water in the nitrating mixture. By using an anhydrous system the "resin" formation is dramatically reduced. It has been ascertained that the "resin" formed in the prior art nitration processes, mentioned above, is essentially 4-fluoro-2'-nitro-4'-aminodiphenylamine. This compound in pure form appears as violet brown crystals (M.P. 120–122° C., F found= 6.54%; theory=6.51%). This results from the reaction between reaction product and starting material which can be described by the following equation:

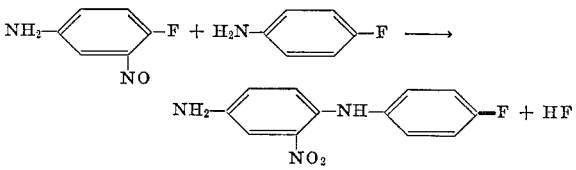

This surprisingly takes place without the aid of any acid-binder and even in the medium of highly concentrated sulfuric acid.

The "resin" production increases proportionately with the increase of water in the nitration mixture. This results in a corresponding decrease in the desired end product.

The fact that the quantity of 4-fluoro-3-nitro-aniline produced in nitrating p-fluoroaniline with a mixture of sulfuric and nitric acid is a function of the quantity of water in the nitrating mixture can be demonstrated with reference to the following. Two nitration reactions of p-fluoroaniline with a nitrating agent containing a mixture of sulfuric acid and nitric acid were run in which the procedure for each reaction was the same, except for the water content of the nitrating mixture. The *same* procedure for *recovering* the desired product was also employed in each case. The total procedure was as follows:

Each procedure involved dissolving p-fluoroaniline in sulfuric acid and then, over a period of an hour, dropwise, adding thereto the mixture of nitric acid and sulfuric acid. The mixture was then allowed to react for one hour to complete the reaction. The temperature of the nitration reaction was maintained at about 0–2° C. The crude product in each case was purified with the same relative quantity of boiling water, i.e., 100 ml. of water for each 3.4 grams of crude. Before the final filtration, the slurries of crystals were allowed to stand in a refrigerator overnight to insure as complete a separation of crystals as possible.

The table below gives the composition of the nitrating mixture and the yield of final product for each case.

| Run No. | Nitration reaction mixture, g. | | | | Yield: percent of theory, 4-fluoro-3-nitroaniline |
|---|---|---|---|---|---|
| | p-Fluoro-aniline | $H_2SO_4$ | $HNO_3$ | Percent $H_2O$ | |
| 1 | 139 | 2,200 (100%) | 81.3 (100%) | ---------- | 61.5 |
| 2 | 139 | 2,200 (95.5%) | [1] 81.3 (100%) | 4.5 | 46.0 |

[1] In the form of 91.6 g. of 88.8% $HNO_3$.

From this it is clear that Run 1, which is representative of the present invention, is far superior to Run 2, which contains water in the reaction mixture.

In ascertaining the relative efficiency of the reaction for preparing 4-fluoro-3-nitroaniline involving nitrating p-fluoroaniline under various reaction conditions, it is necessary to use the same recovery procedure so that a fair comparison can be made of the yields of product. Thus, for example, a less efficient reaction can be made to seem as efficient as a more efficient process by using an elaborate recovery procedure which would be economically prohibitive. On the other hand, a more efficient reaction can be made to appear no more efficient than a less efficient process by using a simplified recovery process which does not remove all of the desired product produced from the crude. However, the latter may be fully justified on the basis of economics, i.e., the reduction in cost due to the simplified recovery procedure may outweigh the advantage of attempting to recover all the desired product from the crude reaction product. Nevertheless, the more efficient reaction produces more of the desired product in the crude reaction mixture. This allows for the selection of a more simplified recovery procedure which still results in final recovery of enough pure product to make the process economically feasible.

This can be illustrated by reference to the Swarts process described above when compared with Example 1 below of the present application. The Swarts recovery process involves a complicated ether extraction of the crude reaction mixture which is then heated to drive off the ether. The crude product is then dissolved in water and the resin is separated. The resin is then extracted three times with boiling water. The composite of these steps gives a yield of 60% of theory. This is increased by 2% by working up the mother liquor. In contrast to this in Example 1 below a yield of 62% of theory is obtained simply by recrystallizing the crude reaction mixture *once* from boiling water. This can be still further increased to 77% by the sample expedient of Example 4, i.e., utilizing dilute hydrochloric acid to separate the pure product from the accompanying "resin."

The further improved yields that attend the use of hydrochloric in the separation procedure as compared with the procedure of recrystallizing from boiling water is best understood with reference to the solubility characteristics of 4-fluoro-3-nitroaniline. One hundred ml. of water dissolved 0.7–0.9 g. of this pure compound at room temperature, and 3.4 g. at 100° C. As a result, on recrystallizing the product which has been dissolved in boiling water, 20–25% remains in the mother liquor after filtration and is lost. In addition, in light of the low solubility of 4-fluoro-3-nitroaniline in boiling water, a relatively large volume of water is needed to separate the pure product from the "resin." Consequently, in attempting to recover the pure product from these large volumes of solution, significant losses of product also occur. In contrast to this, as will be described in more detail below, 4-fluoro-3-nitroaniline is much more soluble in hydrochloric acid so that relatively small volumes of liquid are required to separate the product from the "resin." The desired product is then readily separated from solution by making the solution alkaline.

Another aspect of the present invention is the discovery that it is possible to nitrate p-fluoroaniline using relatively small amounts of sulfuric acid in the nitrating mixture, as compared with prior art processes. This also, obviously, represents a substantial saving. In general, the molar ratio of p-fluoroaniline to sulfuric acid in the nitrating will be in the range of from about 1 to 12 to about 1 to 5; preferably this ratio is 1 to 6.8.

Similarly, the present invention makes it possible to employ only a minumum of excess of nitric acid over the p-fluoroaniline in the nitration reaction mixture, which also adds to the economy of the process. This will ordinarily be in the molar ratio range of from about 1.0 to 1.10 to about 1.0 to 1.03 of fluoroaniline to nitric acid and preferably in the range of 1.0 to 1.03.

The preferred nitrating agent used in the present invention is nitric acid. However, other nitrating agents may be employed. These usually will take the form of salts of nitric acid and particularly the alkali-metal salts. By way of illustration of the other nitrating agents that are useful, potassium or sodium nitrate may be mentioned.

The process of the present invention is most advantageously carried out at relatively low temperature. Temperature ranges of from about 0 to 15° C. are in general suitable for these purposes. However, it is preferred to use a temperature in the range of from about 3° C. to 10° C. These low temperatures of reaction and the low nitric acid content of the nitrating mixture further serve to increase the yield by minimizing the damage of the product by oxidation.

Another facet of the present invention, as noted above, is the discovery that the yield of the desired product, i.e., 4-fluoro-3-nitroaniline, can be further improved by a simple and direct recovery process. This amounts to merely mixing the crude reaction product in cold diluted hydrochloric acid and filtering the mixture. The "resin," which is insoluble, remains behind, and on making the filtrate alkaline, the desired product separates.

The solubility of pure 4-fluoro-3-nitroaniline in hydrochloric acid at room temperature was found to be as follows:

| Concentration of HCl (wt. percent): | Grams of 4-fluoro-3-nitroaniline [1] |
|---|---|
| 0 | 0.7–0.9 |
| 4.15 | 19.5 |
| 8.2 | 34 |
| 12.1 | 49 |
| 15.9 | 71 |
| 19.5 | 12 |

[1] Dissolved in 100 ml. of the acid.

The sudden drop of the solubility of 4-fluoro-3-nitro-aniline in hydrochloric acid having a concentration above about 16% was unexpected and puts an upper limit on the concentration of acid which is useful in the present process. Acid concentrations of between about 3–15% could be employed depending on the degree of purity in which it is desired to recover the product. However, the solubility of the "resin" in hydrochloric acid markedly increases with the concentration of the acid employed. For practical reasons it has been found that it is best to purify the crude product in 4–7% hydrochloric acid, since in this range the "resin" is still practically insoluble. Above this concentration the "resin" begins, slightly, to go into solution and shows up in the final product recovered, imparting thereto a darker color (brown-orange to brown) and lower melting point.

The following examples are further illustrative of the present invention. It is to be understood, however, that the invention is not limited thereto.

EXAMPLE 1

Preparation of 4-fluoro-3-nitroaniline

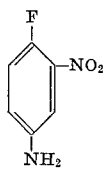

To a solution of 139 g. of p-fluoroaniline in 1390 g. of $H_2SO_4$, 100%, a mixture of 81.3 g. $HNO_3$, 100%, in 810 g. $H_2SO_4$, 100%, is added at 3–5° C. One hour after addition the mixture is poured on ice, neutralized with conc. ammonia, and cooled. The solid obtained is filtered off, dried and recrystallized from 5.1 liters boiling water. The syrupy oil (resin) is separated from the aqueous layer. After cooling the latter to 10° C., yellow-brown crystals are filtered off and dried. Yield: 120 g. (=62% of theory), M.P. 94 to 96° C. (uncorr.).

EXAMPLE 2

Preparation of 4-fluoro-3-nitroaniline

To a solution of 139 g. of p-fluoroaniline in 834 g. of $H_2SO_4$, 100%, a mixture of 81.3 g. of $HNO_3$, 100%, in 489 g. $H_2SO_4$, 100%, is slowly added at 8–10° C. One hour after this addition, the mixture is poured on 800 g. of ice and the resulting solution made alkaline with 2300 ml. of conc. aqua ammonia. On cooling to approximately 5° C., the orange crude product is filtered off, sharply sucked off, and stirred with 600 ml. of water and 120 ml. of conc. HCl at room temperature. The insoluble, dark brown solid (resin) is filtered off, the filtrate made alkaline with 82 g. of solid sodium carbonate, and the solid filtered off and dried in vacuo at 60–70° C. or in the air. Yield: 143 g., light orange crystals (=73% theory), M.P. 95–96° C.

EXAMPLE 3

Preparation of 4-fluoro-3-nitroaniline

The process of Example 2 was followed taking care to minimize mechanical losses of product. The crude product, after drying amounting to 174 g. (=89% of theory, M.P. 88–90° C.) was ground with 270 ml. of hydrochloric acid, 15%, in a porcelain mortar. The insoluble resin (black after drying, 6.0 g.) was filtered off, the filtrate made alkaline with conc. aqua ammonia, the crystalline precipitate filtered off, and dried in the air. Yield: 152.5 g. of red brown crystals (=78.2% of theory, M.P. 94–95° C.). Since relatively strong diluted HCl was used, a small amount of "resin" went into solution, and so contributed to darker color and lower M.P. of the final product.

EXAMPLE 4

The procedure of Example 1 was followed in every respect except that the dried, crude product was purified from ca. 3% hydrochloric acid (1,400 ml. of water and 110 ml. of HCl, ca. 35%). The "resin" was filtered off (5.7 g. when dry) and the filtrate made alkaline with conc. $NH_4OH$. Yield: 149 g. (=77.0% of theory), orange-brown crystals, M.P. 95–96° C.

EXAMPLE 5

To a solution of 69.5 g. of p-fluoroaniline in 1100 g. of $H_2SO_4$, 100%, 65.3 g. of powdered potassium nitrate was added at 8–10° C. over a period of 40 minutes. After holding this one hour at this temperature, the mixture was poured on ice and then worked up in a manner similar to that of Example 2. Yield: 73.8 g., light yellow crystals (=75.5%), M.P. 94–95° C.

The 4-fluoro-3-nitroaniline made in accordance with the present invention is useful in preparing nitro-p-phenylenediamine, the latter being widely used as a hair dye. This is made by the reaction of 4-fluoro-3-nitroaniline with ammonia. Similarly, 4-fluoro-3-nitroaniline may be reacted with a variety of amines to produce substituted nitro-p-phenylenediamines which are also useful as hair dyes.

Although the invention has been described with reference to specific forms thereof, it will be understood that many changes and modifications may be made without departing from the spirit of this invention.

What is claimed is:

1. A process for preparing 4-fluoro-3-nitroaniline which comprises reacting p-fluoroaniline with a nitrating agent under anhydrous conditions and at relatively low temperatures whereby resin formation is reduced and the damage to the resulting product by oxidation is minimized; said nitrating agent comprising sulfuric acid and a material selected from the group consisting of nitric acid and alkali-metal salts thereof.

2. A process according to claim 1 wherein the nitrating agent is a mixture of nitric acid and sulfuric acid.

3. A process according to claim 2 wherein the molar ratio of p-fluoroaniline to sulfuric acid is in the range of from about 1 to 5 to about 1 to 12.

4. A process according to claim 3 wherein the molar ratio of p-fluoroaniline to sulfuric acid is 1.0 to 6.8.

5. A process according to claim 3 wherein the molar ratio of p-fluoroaniline to nitric acid is in the range of about 1.0 to 1.03 to about 1.0 to 1.10.

6. A process according to claim 5 wherein the molar ratio of p-fluoroaniline to nitric acid is 1.0 to 1.03.

7. A process according to claim 5 wherein the reaction is carried out at a temperature in the range of about 0° C. to 15° C.

8. A process according to claim 7 wherein the reaction is carried out at a temperature in the range of about 3° C. to 10° C.

9. A process according to claim 1 including the step of mixing the crude reaction product of claim 1 with cold, dilute hydrochloric acid to dissolve and separate the 4-fluoro-3-nitroaniline therefrom and then recovering the 4-fluoro-3-nitroaniline from said acid solution by making it alkaline.

10. A process according to claim 9 wherein the dilute hydrochloric acid has a concentration in the range of about 4–7% by weight.

11. A process for preparing 4-fluoro-3-nitroaniline which comprises reacting p-fluoroaniline with a nitrating agent comprising a mixture of nitric acid and sulfuric acid under anhydrous conditions to form a crude reaction mixture; mixing said crude reaction mixture with cold dilute hydrochloric acid to dissolve and separate the 4-fluoro-3-nitroaniline therefrom and recovering the 4-fluoro-3-nitroaniline from said acid solution by making it alkaline; the molar ratio of p-fluoroaniline to sulfuric acid employed being in the range of from 1–5 to about 1–12; the molar ratio of p-fluoroaniline to nitric acid employed being in the range of from about 1.0 to 1.03 to about 1.0 to 1.10; said reaction being carried out at a temperature in the range of 0°–15° C.

References Cited

UNITED STATES PATENTS 3,062,885  11/1962  Kaplan _____ 260—578

OTHER REFERENCES

Swarts, Rec. Trav. Chem., vol. 35, 1916, page 131.

CHARLES B. PARKER, Primary Examiner

R. L. RAYMOND, Assistant Examiner

U.S. Cl. X.R.

260—583M, 688